United States Patent Office
3,478,018
Patented Nov. 11, 1969

3,478,018
PROCESS FOR PRODUCING α-AMINO PENICILLINS
Charles A. Robinson and John J. Nescio, West Chester, Pa., assignors to American Home Products Corporation, New York, N.Y., a corporation of Delaware
No Drawing. Filed Oct. 2, 1967, Ser. No. 671,951
Int. Cl. C07d 99/20; A61k 21/00
U.S. Cl. 260—239.1                    8 Claims

ABSTRACT OF THE DISCLOSURE

A method for preparing silylated α-amino penicillins comprising preparation of an amine base salt of 6-aminopenicillanic acid by reacting the latter with a strong amine in an organic solvent devoid of hydroxyl groups; adding to the resulting mixture of the amine base salt of 6-aminopenicillanic acid, which has had added thereto a weak amine base, a silylating agent; and then adding to the last resulting mixture, the chloride hydrochloride of a suitable α-amino acid to form, by acylation, the silylated hydrochloride of the desired α-amino penicillin. The resulting silylated penicillin hydrochloride is useful for conversion into the corresponding α-amino penicillin having potent antibiotic activity, as by simple hydrolysis or alcoholysis, followed either by transformation of the resulting penicillin hydrochloride into an aryl sulfonic acid salt thereof which may be neutralized to the penicillin per se by addition of a suitable base, or by the raising of the pH of the reaction mixture to the iso-electric point to cause precipitation of the desired penicillin.

Background of the invention

This invention relates generally to the preparation of α-amino penicillins having potent antibiotic activity, and more particularly to a novel process for preparing the silylated forms of certain α-amino penicillin hydrochlorides defined hereinafter, which are easily convertible to the desired α-amino penicillins per se by hydrolysis or alcoholysis, followed either by transformation of the resulting penicillin hydrochloride into an aryl sulfonic acid salt of the penicillin which may be neutralized to the penicillin per se by addition of a suitable organic base, or by the raising of the pH of the reaction mixture to the iso-electric point to cause precipitation of the desired penicillin.

The so-called "silyl" route to the production of penicillins is now generally known. For example, in U.S. Patent No. 3,249,622 there is disclosed a process for preparing penicillins generally by said "silyl" route. However, the process therein disclosed is not particularly adapted to the preparation of α-amino penicillins. Moreover, for the preparation of silylated 6-aminopenicillanic acid, which is later to be acylated, the patent states a preference for hydrocarbons and ethers as solvents. There is no suggestion at all that other types of organic solvents devoid of hydroxyl groups may be advantageously substituted. Furthermore, in all the examples given in the patent, in which trimethylchlorosilane is used as silylating agent, there is shown the use of benzene or toluene as solvent, and the need for reflux for five hours (at 80–110° C.) to form the silylated 6-aminopenicillanic acid.

In Glombitza, Annalen 673, 166 (1964) there is disclosed the preparation of penicillins (similarly not including α-amino penicillins) by a "silyl" route using as silylating agent, hexamethyldisilazane in chloroform. The use of hexamethyldisilazane for the preparation of silylated 6-aminopenicillanic acid has the disadvantage that the by-product ammonia formed in the reaction must be completely removed before proceeding to the acylation step.

In Irish Patent No. 7,436 (which matured from application No. 102/63), there is disclosed an extension of the silyl route to the preparation of α-amino penicillins. Therein, for the preliminary preparation of the requisite silylated 6-aminopenicillanic acid, preference is disclosed for heating 6-aminopenicillanic acid with more than two moles of N-trimethylsilyldiethylamine at 60–170° C. so that diethylamine distills off. Moreover, excess N-trimethylsilyldiethylamine must be removed by vacuum distillation and all by-product diethylamine must be absent for optimum results in the succeeding acylation stage. In using this preferred procedure of the patent, the highest yield of the α-amino penicillin, ampicillin, reported to have been obtained is 57% (cf. Example 5 of the patent).

The Irish patent also discloses the preparation of silylated 6-aminopenicillanic acids by use of trimethylchlorosilane with a sodium, potassium, or calcium salt of 6-aminopenicillanic acid in benzene, toluene, formamide, or dimethylformamide, in the presence of a tertiary amine base. Such a process requires the additional preliminary step of preparing the salt of 6-aminopenicillanic acid for use as a starting material. In Example 2 of the patent, wherein this procedure is used, evaporation of the reaction mixture afforded very low yields (25–29%) of disilylated 6-aminopenicillanic acid.

Description of the invention

With the foregoing disadvantages and shortcomings of the prior art in view, it is a primary object of the present invention to provide a practical method for preparing α-amino penicillins of the group defined hereinafter, in high yield from commercially available starting materials by a process employing mild reaction conditions and short reaction times, without the necessity for the removal of any by-products or the distillation of any solvents, and without the isolation of any intermediates.

In accordance with the present invention, the novel process of the invention is useful for preparing silylated α-amino penicillins of the group having the formula:

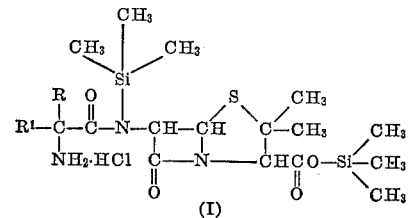

(I)

wherein when R and $R^1$ are separate, R is hydrogen and $R^1$ is phenyl, and when R and $R^1$ are joined, they complete a cycloalkyl ring of from four to seven carbon atoms. In its broadest aspects, said method comprises (1) preparing a mixture of 6-aminopenicillanic acid and a strong amine and a weak amine in an organic solvent devoid of hydroxyl groups; and (2) adding to said mixture a tri(lower) alkylchlorosilane to form a silylated derivative of 6-aminopenicillanic acid; then (3) adding to the resulting mixture containing said derivative, an organic acid chloride hydrochloride of the group having the formula:

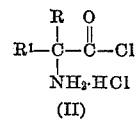

(II)

wherein R and $R^1$ have the same meaning as in Formula I above.

In a preferred embodiment of the process of the invention, in step (I) above, the organic solvent devoid of hydroxyl groups is selected from the group consisting of methylene chloride, ethylene chloride, tetrahydrofuran, dimethyl formamide, and acetonitrile; the molar ratio of the strong amine per mole of 6-aminopenicillanic acid is in the range of from 1 to about 2 moles, and that of the weak amine is in the range of .75 to 1.25 moles per mole of 6-aminopenicillanic acid. In step (2), there is added to the said mixture, the tri(lower)alkylchlorosilane, in amount so that the molar ratio of said silane is in the range of from 1 to about 2 moles per mole of 6-aminopenicillanic acid, with the molar ratios of said strong amine and said silane substantially equal to form the silylated 6-aminopenicillanic acid. In step (3), the mixture is cooled and the organic acid chloride hydrochloride of Formula II above is added in amount to provide a molar ratio of .75 to 1.25 per mole of 6-aminopenicillanic acid.

As used herein, "strong amines" includes those aliphatic secondary and tertiary amines, which may be straight or branched chain, saturated or unsaturated, symmetrical or unsymmetrical, but which are particularly chaacrterized by having dissociation constants in the range of from $10^{-3}$ to $10^{-6}$, or having comparable basicity, as distinguished from "weak amines" which are characterized by having dissociation constants in the range of from $10^{-8}$ to $10^{-11}$.

In the reaction of 6-APA with the strong amine and tri(lower)alkylchlorosilane in the selected solvent to form the silylated 6-APA, for example, in the preparation of disilylated α-aminobenzyl penicillin hydrochloride with the ultimate view of obtaining ampicillin, results have been obtained with the use of various alkyl amines as given in Table A below:

TABLE A

| Amine | Dissociation Constant | Overall Yield of Ampicillin, Percent |
| --- | --- | --- |
| Triethylamine | $5.6 \times 10^{-4}$ | 78 |
| Diethylamine | $1.3 \times 10^{-3}$ | 79 |
| Amberlite XE-204 | | 66 |
| Amberlite LA-2 | | 54 |
| Tri-n-octylamine | | 63 |
| Tri-n-decylamine | | |

Additionally, the use of any trihexylamine, 2,2-diethyldihexylamine, and Amberlite LA-1 (an aliphatic unsymmetrical branched chain unsaturated secondary amine) has resulted in overal yields of ampicillin anhydrous above about 65%. Amberlite LA-2 listed in Table A above is similar to Amberlite LA-1 except that former is saturated. Amberlite XE-204 is generally similar to Amberlite LA-2 except that it is a tertiary amine.

It has also been found that, for obtaining the maximum yield of ultimate product, the amount of strong amine in the reaction is preferably limited to no more than substantially one mole per mole of the tri(lower)alkylchlorosilane used, as shown in Table B below:

TABLE B

| | Overall yield of ampicillin, percent |
| --- | --- |
| Percent excess triethylamine: | |
| 0 | 78 |
| 10 | 68 |
| 15 | 58 |
| Percent excess diethylamine: | |
| 0 | 79 |
| 35 | 59 |

It has further been found that the reaction, when triethylamine for example, is selected as the strong amine, requires refluxing (43° C.) for at least two hours if carried to completion. However, reaction time can be eliminated at this point without significant reduction in yield, if the reaction time with the tri(lower)alkylchlorosilane is extended. With the use of diethylamine as strong amine, the reaction in step (1) is essentially complete in 15 minutes at 20° C.

In the addition of tri(lower)alkylchlorosilane to form the silylated 6-APA in step (2), theoretically, from 1 to 2 moles of tri(lower)alkylchlorosilane per mole of 6-APA can be used to give mono- or disilylated 6-APA or mixtures of mono- and disilylated 6-APA. However, using 1.1 moles of the silane per mole of 6-APA, in which case the proportion of disilylated 6-APA formed is relatively small, the overall yield when ampicillin was being prepared, was 50% compared to a yield of 79% when 2.0 moles of the silane per mole of 6-APA was used in comparable runs.

Although the reaction of trimethylchlorosilane with an amine salt of 6-APA in methylene chloride, for example, is fairly complete at room temperatures; refluxing increases the yield of ultimate penicillin (using two moles of trimethylchlorosilane per mole of 6-APA) when triethylamine is used as the amine. The improved yields obtained by refluxing (as applied in the production of ampicillin, for example), appears in Table C below:

TABLE C

| Reaction conditions: | Overall yield of ampicillin, percent |
| --- | --- |
| 1¼ hours at 15–20° C. | 68 |
| ¾ hour at reflux (43° C.) | 78 |
| 2 hours at reflux (43° C.) | 77 |

In the addition of the organic acid chloride hydrochloride to the reaction mixture (step (3)) in the presence of at least a molar equivalent of a weak tertiary amine as proton acceptor, the amount of said acid chloride hydrochloride used is preferably substantially equimolar with the 6-APA used as starting material. The acid chloride hydrochloride is preferably added portionwise under low temperature conditions, optimally at 10° C. or lower for better yields, as appears in Table D below:

TABLE D

| Addition temp.: | Overall yield of ampicillin, percent |
| --- | --- |
| 18–20° C. | 65 |
| 10° C. | 77 |
| 0–2° C. | 77 |
| −10° C. | 78 |

Upon completion of addition of the organic acid chloride hydrochloride to the reaction mixture, subsequent reaction at 0° C. (for one hour) or at from 18 to 20° C. (for one-half hour) has been found to be adequate. On the other hand, continued reaction for as long as 21 hours at 10° C. is not seriously deleterious to the yield.

Although the weak amine base may be added for convenience in step (1), it can equally be added at any time prior to the addition of the acid chloride hydrochloride in step (3). For this purpose, any weak tertiary amine such as dimethylaniline, pyridine, quinoline or 2,6-lutidine can be employed, whereas stronger amines such as N-ethylmorpholine are deleterious, as exemplified in Table E below:

TABLE E

| Weak Base | Dissociation Constant | Overall Yield of Ampicillin, Percent |
| --- | --- | --- |
| N,N-dimethylaniline | $3.8 \times 10^{-10}$ | 78 |
| Pyridine | $1.7 \times 10^{-9}$ | 76 |
| N-ethylmorpholine | $5 \times 10^{-7}$ | 15 |

By the term weak amine, as also referred to hereinbefore, is meant those amines having dissociation constants in the range of from $10^{-8}$ to $10^{-11}$.

In this connection, it is noted that the use of even as much as a 50% excess of the weak amine has no adverse effect on the yield of the disilylated 6-APA, and hence, on the ultimate yield of the penicillin desired.

Given below is a schematic representation of the steps (1) to (3) described above:

(1) 6-APA + Strong Amine ⟶ (6-APA amine, salt)

(2) (6-APA amine, salt) + 2(CH₃)₃SiCl + Strong Amine ⟶
Disilyl 6-APA + 2(Strong Amine·HCl)

(3)
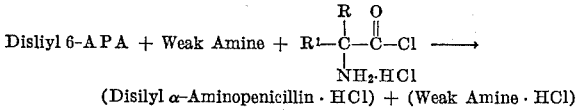
(Disilyl α-Aminopenicillin · HCl) + (Weak Amine · HCl)

wherein 6-APA represents 6-aminopenicillanic acid and R and R¹ have the same meaning as in Formula I.

In the overall procedure in which the disilylated penicillin hydrochloride formed in accordance with the invention is then used to obtain the ultimate penicillin, said disilylated penicillin hydrochloride is added to water to remove the silyl groups. In this step; the α-aminopenicillin hydrochloride can be completely removed from the solvent reaction mixture by extraction with cold water. In this connection, it has been found that extraction with 3×10 to 3×35 ml. of water per g. of 6-APA used as starting material has afforded satisfactory results.

In the event the ultimate penicillin to be obtained is α-aminobenzyl penicillin (ampicillin), it has been found advantageous to change the chloride to an aryl sulfonic acid salt of the aminopenicillin either by adding an appropriate sulfonic acid to the reaction mixture comprising the selected organic solvent and water, or to the aqueous extracts separated as described immediately above. In this connection, a 25% excess of the sulfonic acid has been used to advantage in preparing the corresponding salt of ampicillin.

The aryl sulfonic salt of the α-aminobenzyl penicillin may then be converted to the penicillin per se by reaction with a base such as triethylamine or diethylamine in approximately 85% isopropanol. In the case of ampicillin specifically, the sulfonic acid salt, wet with water and ethyl acetate, may be added to isopropanol containing a molar equivalent of triethylamine at 75–80° C., whereby the anhydrous form of ampicillin described and claimed in U.S. Patent 3,144,445 is formed and collected by filtration from the hot mixture.

Alternatively, the corresponding penicillin may be obtained, but in hydrated form, by raising the pH of the aqueous reaction mixture containing the hydrochloride salt of said penicillin to the iso-electric point.

The subsequent steps in the production of the α-aminopenicillin per se from the disilyl aminopenicillin hydrochloride is represented schematically below with reference specifically to the production of ampicillin:

SCHEMATIC REPRESENTATION (4) (Disilyl Ampicillin·HCl) + H₂O ⟶
(Ampicillin HCl) + (CH₃)₃SiOSi(CH₃)₃

(5)
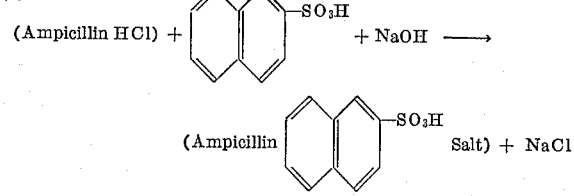

(6)
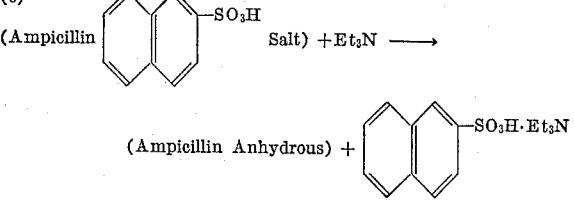

The following examples are illustrative of the invention and should not be considered as necessarily limitative thereof:

EXAMPLE 1

Preparation of anhydrous ampicillin (A) To 43.2 g. (0.20 mole) of 6-aminopenicillanic acid and 450 ml. of methylene chloride in a dry 1 l. 3-neck flask fitted with stirrer, thermometer, nitrogen inlet, and reflux condenser with drying tube, 40.5 g. (0.40 mole) of triethylamine and 26.7 g. (0.22 mole) of N,N-dimethylaniline were added. The mixture was cooled and 43.4 g. (0.40 mole) of trimethylchlorosilane was added dropwise at 12–15° C.

(B) The mixture was refluxed for 45 minutes, cooled under nitrogen, and 41.3 g. (0.20 mole) of D(-)phenylglycyl chloride hydrochloride added portionwise at −10° C. over 20 minutes. After stirring at −10° C. for one-half hour, the mixture was allowed to stir at 10° C. for an additional one-half hour.

(C) The reaction mixture was poured into 900 ml. of cold water with stirring and the aqueous layer separated. The methylene chloride layer was reextracted twice with 900 ml. of cold water adjusting the mixture to pH 1.8–2.0 with dilute hydrochloric acid each time.

(D) After clarifying the combined aqueous extracts by filtration, 150 ml. of ethyl acetate was added and a solution of β-naphthalene sulfonic acid containing 52 g. (0.25 mole) of active agent was added dropwise with stirring while maintaining a pH of 1.5–1.8 by concurrent addition of dilute sodium hydroxide.

After stirring overnight at 2–5° C., the white, crystalline naphthalene sulfonic acid salt of ampicillin was collected by filtration, washed thoroughly with cold water and finally with ethyl acetate. A sample dried in a vacuum oven at 50–60° C. showed the wet filter cake (181 g.) to contain 56.2% solids.

(E) The wet filter cake was added to a solution of 210 ml. of isopropanol and 19.4 g. of triethylamine at 75–80° C. with rapid stirring and then allowed to stir for 15 minutes. The white, crystalline ampicillin anhydrous was filtered from the hot reaction mixture, washed with 85% aqueous isopropanol and dried at 45° C.; yield, 54½ g. or 78% of theory based on 6-aminopenicillanic acid; iodometric assay, 988 mcg. per mg.; bioassay, 970 mcg. per mg.

EXAMPLE 2

The process described in Example 1 was followed, but methylene chloride was replaced by 1,2-dichloroethane (ethylene-dichloride) as reaction solvent. The yield of ampicillin anhydrous was 56% of theory based on the starting 6-APA.

EXAMPLE 3

Preparation of 1-aminocyclohexane penicillin (A) To 21.6 g. (0.10 mole) of 6-APA and 213 ml. of methylene chloride in a dry 500 ml. 3-neck flask fitted with stirrer, thermometer, nitrogen inlet and reflux condenser with drying tube, 25.3 g. (0.25 mole) of triethylamine and 13.4 g. (0.11 mole) of N,N-dimethylaniline were added. After stirring at reflux for one hour, the mixture was cooled and 21.7 g. (0.20 mole) of trimethylchlorosilane was added dropwise at 12–15° C.

(B) The mixture was refluxed for 45 minutes, cooled under nitrogen, and 19.8 g. (0.10 mole) of 1-amino-1-cyclohexane-carboxylic acid chloride HCl was added portionwise at −10° C. over 20 minutes. The mixture was stirred for an additional hour while the temperature rose to 20° C.

(C) The reaction mixture was poured into 200 ml. of cold water with stirring and the two-phase mixture clarified by filtration. Dilute sodium hydroxide solution was added to the filtrate at 5–10° C. to pH 5.4.

(D) After stirring overnight at room temperature, the crystalline product was collected by filtration, washed with water and finally with acetone, and then dried at 45° C.; yield of dihydrate, 29.9 g. or 79% of theory based on 6-APA; iodometric assay, 922 mcg. per mg.; bioassay, 921 mcg. per mg.

EXAMPLE 4

The process of Example 1 described in (A) and (B) thereof is again followed. Thereafter, instead of following completely the procedure described in (C) of Example 1, the reaction mixture obtained after pouring into the cold water, and subjected to clarification of the two-phase mixture formed by filtration thereof, is brought to the iso-electric point, pH 5.0 by addition of dilute sodium hydroxide solution at 5–10° C. After stirring overnight at room temperature, the crystalline product is collected by filtration, washed with water, and then dried at 45° C. to yield ampicillin trihydrate.

EXAMPLE 5

Following the procedure of Example 1, but substituting for the triethylamine the following strong amines, overall yields of ampicillin anhydrous above about 65% were obtained:

Tri-n-octylamine
Amberlite LA-1
2,2'-diethyldihexylamine
Tri-n-octylamine-mixture
Tri-n-decylamine-mixture
Diethylamine
Amberlite XE-204

EXAMPLE 6

To 43.2 g. of 6-APA and 450 ml. of methylene chloride in a 1 l. 3-neck flask fitted with stirred, thermometer, nitrogen inlet and drying tube, 96.7 g. (0.40 mole) of 2,2'-diethyldihexylamine and 26.7 g. of N,N-dimethylaniline are added. The mixture is cooled and 43.4 g. of trimethylchlorosilane is added dropwise at 10–15° C.

After heating at reflux for one hour, the mixture is cooled and 42.0 g. of D(—) phenylglycyl chloride hydrochloride is added portionwise over 20 minutes at —10° C. Reaction is completed by stirring at —10° C. for one-half hour and then at 10° C. for 15 minutes The reaction mixture is poured into 900 ml. of cold water, and ampicillin anhydrous is isolated as described in Example 1 in 75% yield based on 6-APA; iodometric assay, 983 mcg. per mg.

EXAMPLE 7

Utilizing the procedure of Example 1, A, B, and C only, the following organic solvents have been employed in the process to obtain yields of the naphthalene sulfonic acid salt of ampicillin as given in Table F below:

TABLE F

| Solvent: | Yield of sulfonic acid salt, percent |
| --- | --- |
| Methylene chloride | 91 |
| Ethylene dichloride | 72 |
| Benzene | 36 |
| Ethyl ether | 32 |
| Methylisobutylketone | 31 |

EXAMPLE 8

The procedure of Example 1, A, and B only, was followed but substituting acetonitrile for methylene chloride as reaction medium. Thereafter, the reaction mixture was poured into 1200 ml. of cold water with stirring, and the procedure of Example 1, D was then followed. The yield of the B-naphthalene sulfonic acid salt of ampicillin obtained was 76% of theory.

EXAMPLE 9

(A) The procedure of Example 8 was followed substituting tetrahydrofuran for acetonitrile. A 70% yield of the sulfonic acid salt of ampicillin was obtained.

(B) The procedure of Example 8 was again followed, but in this case substituting dimethyl formamide for acetonitrile, to obtain a yield of 71%.

EXAMPLE 10

To 43.2 g. of 6-APA and 425 ml. of methylene chloride in a 1 l. 3-neck flask fitted with stirrer, thermometer, nitrogen inlet, and drying tube, 16.1 g. (0.22 mole) of diethylamine and 26.7 g. of N,N-dimethylaniline are added. After stirring at room temperature for one hour, the nearly clear solution is treated with 24.0 g. (0.22 mole) of trimethylchlorosilane at 10–15° C. and then allowed to reflux for 45 minutes to result in mostly monosilylation of the 6-APA.

Reaction with D(—)phenylglycyl chloride hydrochloride and recovery of ampicillin anhydrous as described in Example 1 affords a 50% overall yield from 6-APA; iodometric assay, 992 mcg. per mg.

EXAMPLE 11

Following the entire procedure described in Example 1, 17.4 g. (0.22 mole) of pyridine is used in place of the N,N-dimethylaniline. The overall yield of ampicillin anhydrous is 53.1 g., or 76% of theory based on 6-APA; bioassay, 990 mcg. per mg.

EXAMPLE 12

Following the procedure of Example 3, the following acid chloride hydrochlorides, as given in Table G, are substituted for 1-amino - 1 - cyclohexane carboxylic acid chloride hydrochloride to prepare the corresponding penicillins, which are disclosed per se in U.S. Patent 3,194,802.

TABLE G

Carboxylic acid chloride hydrochloride 1-amino-1-cyclobutane
1-amino-1-cyclopentane
1-amino-1-cycloheptane

We claim:
1. A method of preparing a disilylated, acid chloride salt of a penicillin of the group having the following formula:

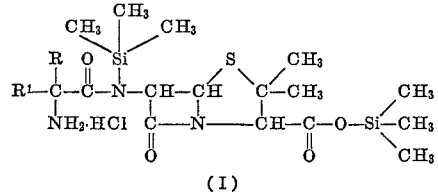

(I)

wherein, when R and R¹ are separate, R is hydrogen and R¹ is phenyl, and when R and R¹ are joined, they complete a cycloalkyl ring of from four to seven carbon atoms; which method comprises:

(1) preparing a mixture of 6-aminopenicillanic acid, a strong amine, and a weak amine, in an organic solvent devoid of hydroxyl groups;
(2) incorporating in said mixture a tri(lower) alkylchlorosilane; and then
(3) adding to the resulting mixture, an organic acid chloride hydrochloride of the group having the formula:

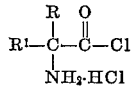

wherein R and R¹ have the same meaning as in Formula I above; and wherein in (1), the molar ratio of the strong amine per mole of 6-aminopenicillanic acid is in the range of from 1 to about 2 moles; and that of the weak amine is in the range of from .75 to 1.25 moles per mole of 6-aminopenicillanic acid; in (2), the tri(lower)alkylchlorosilane is added to said mixture in amount so that the molar ratio of said silane is in the range of from 1 to about 2 moles per mole of 6-aminopenicillanic acid, with the molar ratios of said strong amine and said silane substantially equal; and in (3), the mixture is cooled and the organic acid chloride hydrochloride is added in amount to provide a molar ratio of .75 to 1.25 per mole of 6-aminopenicillanic acid.

2. A method of preparing a disilylated, acid chloride salt of a penicillin, as defined in claim 1, wherein the organic solvent devoid of hydroxyl groups is selected from the group consisting of methylene chloride, ethylene dichloride, tetrahydrofuran, dimethyl formamide, and acetonitrile.

3. A method of preparing a disilylated, acid chloride salt of a penicillin, as defined in claim 2, wherein the strong amine is selected from the group consisting of diethylamine, triethylamine, trihexylamine, and 2,2'-diethyldihexylamine.

4. A method of preparing a disilylated, acid chloride salt of a penicillin, as defined in claim 3, wherein the weak amine is selected from the group consisting of N,N-dimethylaniline, quinoline and pyridine.

5. A method of preparing a disilylated, acid chloride salt of a penicillin, as defined in claim 4, wherein the silylating agent is trimethylchlorosilane.

6. A method of preparing a disilylated, acid chloride salt of a penicillin, as defined in claim 5, wherein the organic acid chloride hydrochloride is selected from the group consisting of D(—) phenylglycyl chloride hydrochloride and 1-amino-1-cyclohexane carboxylic acid chloride hydrochloride.

7. A method of preparing a derivative o 6-aminopenicillanic acid in a reaction medium suitable for use in subsequent procedures for preparing penicillin derivatives, which method comprises preparing a mixture of 6-aminopenicillanic acid, a strong amine, and a weak amine in an organic solvent devoid of hydroxyl groups, in molar ratios of from 1 to about 2 moles of strong amine and from .75 to 1.25 moles of weak amine per mole of 6-aminopenicillanic acid; and then refluxing said mixture.

8. A method of preparing a derivative of 6-aminopenicillanic acid as defined in claim 7, wherein, subsequently to the refluxing of the mixture, a tri(lower)alkylchlorosilane is added thereto in molar ratio of from 1 to about 2 moles per mole of 6-aminopenicillanic acid, with the molar ratios of said strong amine and said silane substantially equal; and thereafter the mixture is refluxed.

References Cited
UNITED STATES PATENTS 3,249,622  5/1966  Herrling et al. _____ 260—239.1

NICHOLAS S. RIZZO, Primary Examiner